(12) United States Patent
Sun et al.

(10) Patent No.: US 11,143,532 B2
(45) Date of Patent: Oct. 12, 2021

(54) ADAPTIVE CALIBRATION OF SENSORS THROUGH COGNITIVE LEARNING

(71) Applicant: International Business Machines Corporation, Armonk, NY (US)

(72) Inventors: Wei Sun, Beijing (CN); Ning Duan, Beijing (CN); Ren Jie Yao, Beijing (CN); Chun Yang Ma, Beijing (CN); Peng Ji, Nanjing (CN); Jing Chang Huang, Shanghai (CN); Peng Gao, Beijing (CN); Zhi Hu Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 15/787,879

(22) Filed: Oct. 19, 2017

(65) Prior Publication Data

US 2019/0121782 A1 Apr. 25, 2019

(51) Int. Cl.
   *G01D 18/00* (2006.01)
   *H04W 84/04* (2009.01)
   *G01D 21/02* (2006.01)
   *G06N 20/00* (2019.01)
   *H04W 84/18* (2009.01)

(52) U.S. Cl.
   CPC .......... *G01D 18/008* (2013.01); *G01D 21/02* (2013.01); *G06N 20/00* (2019.01); *H04W 84/04* (2013.01); *H04W 84/18* (2013.01)

(58) Field of Classification Search
   CPC ...... G01D 18/008; G01D 21/02; G06N 20/00; H04W 84/04; H04W 84/18
   See application file for complete search history.

(56) References Cited

U.S. PATENT DOCUMENTS 3,562,423 A * 2/1971 Murphy ................ G01S 3/7864
                                                348/170
2001/0053960 A1 * 12/2001 Lim .................... G01R 31/3191
                                                702/85

(Continued)

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pages.

*Primary Examiner* — Francis C Gray
(74) *Attorney, Agent, or Firm* — Jared C. Chaney

(57) ABSTRACT

Embodiments of the present invention may be directed toward a method, a system, and a computer program product of adaptive calibration of sensors through cognitive learning. In an exemplary embodiment, the method, the system, and the computer program product include (1) in response to receiving a data from at least one calibration sensor and data from an itinerant sensor, comparing the data from the at least one calibration sensor and the data from the itinerant sensor, (2) in response to the comparing, determining, by one or more processors, the accuracy of the itinerant sensor, (3) generating, by the one or more processors, one or more calibration parameters based on the determining and based on a machine learning associated with preexisting sensor information, and (4) executing, by the one or more processors, the one or more calibration parameters.

20 Claims, 9 Drawing Sheets

(56) References Cited

U.S. PATENT DOCUMENTS

| | | | |
|---|---|---|---|
| 2012/0235865 A1* | 9/2012 | Nath | H04W 64/00 |
| | | | 342/451 |
| 2014/0238100 A1 | 8/2014 | Londergan et al. | |
| 2014/0278186 A1 | 9/2014 | Herzl et al. | |
| 2016/0004971 A1* | 1/2016 | Verkasalo | G06Q 30/02 |
| | | | 706/12 |
| 2016/0091385 A1 | 3/2016 | Heshmati et al. | |
| 2016/0205238 A1* | 7/2016 | Abramson | G08G 1/0137 |
| | | | 455/456.4 |
| 2016/0328647 A1* | 11/2016 | Lin | G06F 17/11 |
| 2018/0284735 A1* | 10/2018 | Cella | G01M 13/045 |

* cited by examiner

ADAPTIVE CALIBRATION OF SENSORS THROUGH COGNITIVE LEARNING

BACKGROUND

The present invention relates to sensors, and more specifically, adaptive calibration of sensors through cognitive learning.

SUMMARY

Embodiments of the present invention may be directed toward a method, a system, and a computer program product of adaptive calibration of sensors through cognitive learning. In an exemplary embodiment, the method, the system, and the computer program product include (1) in response to receiving a data from at least one calibration sensor and data from an itinerant sensor, comparing the data from the at least one calibration sensor and the data from the itinerant sensor, (2) in response to the comparing, determining, by one or more processors, the accuracy of the itinerant sensor, (3) generating, by the one or more processors, one or more calibration parameters based on the determining and based on a machine learning associated with preexisting sensor information, and (4) executing, by the one or more processors, the one or more calibration parameters.

DETAILED DESCRIPTION

Figure 1:
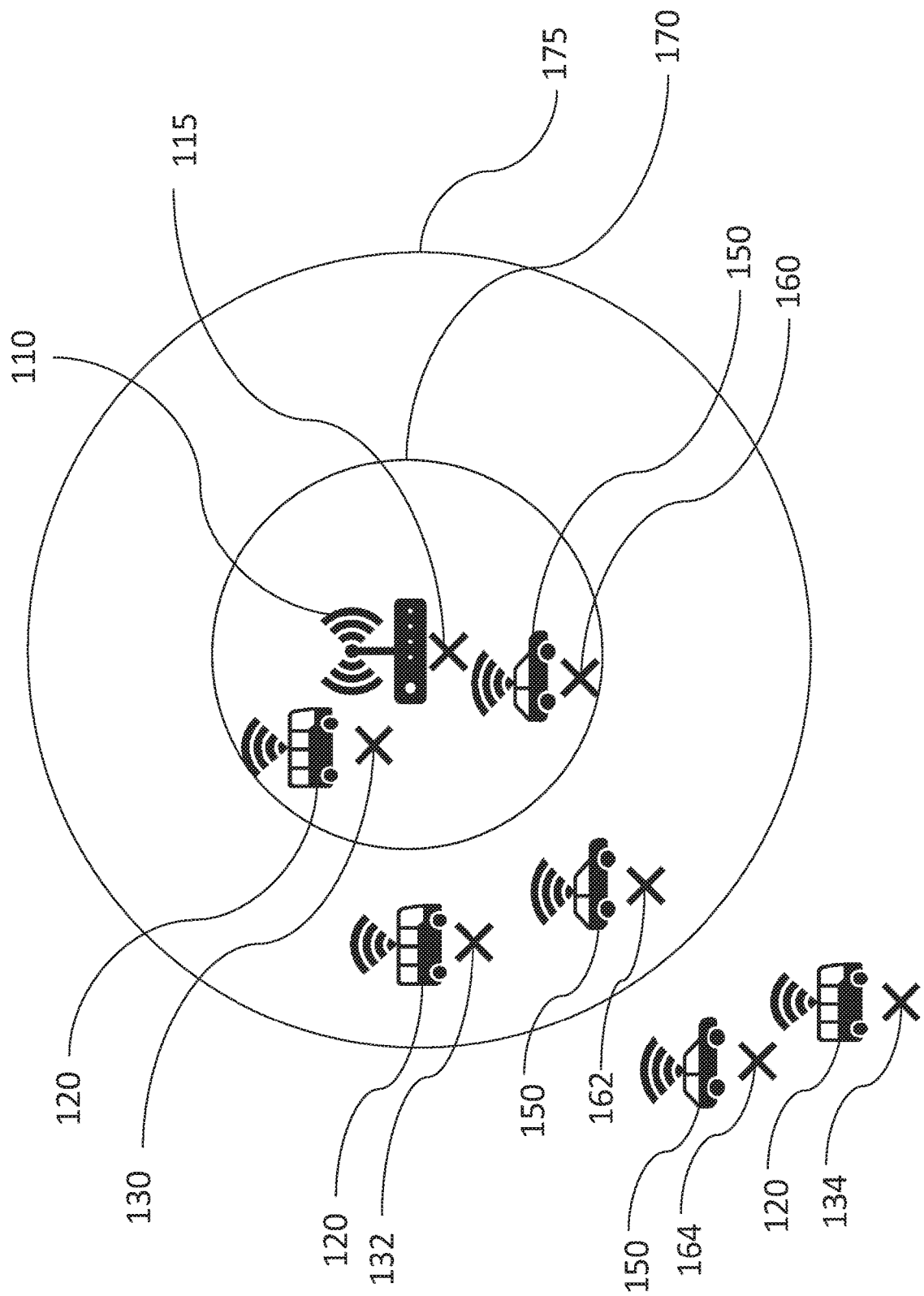
FIG. 1 depicts a diagram of an example sensor system, in accordance with an exemplary embodiment.

The present invention provides a method, a system, and a computer program product for adaptive calibration of sensors through cognitive learning. In an exemplary embodiment, the method, the system, and the computer program product include (1) in response to receiving a data from at least one calibration sensor and data from an itinerant sensor, comparing the data from the at least one calibration sensor and the data from the itinerant sensor, (2) in response to the comparing, determining, by one or more processors, the accuracy of the itinerant sensor, (3) generating, by the one or more processors, one or more calibration parameters based on the determining and based on a machine learning associated with preexisting sensor information, and (4) executing, by the one or more processors, the one or more calibration parameters. In an exemplary embodiment, the method, the system, and the computer program product further include (1) in response to receiving a second set of data from the itinerant sensor and a set of data from a mobile sensor, comparing the second set of data from the itinerant sensor and the data from the mobile sensor, (2) in response to the comparing the second set of data from the itinerant sensor and the data from the mobile sensor, determining, by one or more processors, the accuracy of the mobile sensor, (3) generating, by the one or more processors, one or more mobile sensor calibration parameters based on the determining the accuracy of the mobile sensor and based on a machine learning associated with preexisting mobile sensor information, and (4) executing, by the one or more processors, the one or more mobile sensor calibration parameters. In an embodiment, the one or more processor used for the mobile sensors are different from the one or more processor used for the itinerant sensor. In an embodiment, the one or more processor used for the mobile sensors are same as the one or more processor used for the itinerant sensor. For example, the executing could be done where the mobile sensor is beyond a reliability range of the at least one calibration sensors, and where the mobile sensor is within a reliability range of the itinerant sensor.

Generally, the more accurate and reliable a sensor is, the more expensive that sensor is. More and more mobile devices (e.g., mobile phones, drones, cars, busses, etc.) are using a multitude of sensors to take readings on the environment around the devices. In some cases, such as autonomous vehicles, those sensor readings can have serious health and/or safety implications. For example, the stopping distance for a vehicle could depend on the weather conditions of the surrounding environment. For example, autonomous vehicles could use those conditions to determine the safest course of action for a vehicle. However, if the sensors are malfunctioning or giving inaccurate readings, it could lead the autonomous vehicle to select the wrong course of action.

In an embodiment, machine learning is used to calibrate sensors or develop sensor calibration parameters. In an embodiment, a sensor system uses machine learning of structured data (e.g., the sensors readings, other sensor's readings, conversion tables, sensor reading graphs, etc.) and unstructured data (e.g., sensor manuals, sensor research, error reports, etc.) to calibrate sensors or develop sensor calibration parameters. In an embodiment, calibration of a sensor includes at least one of, adjusting the reading of the sensor, giving an error report for the sensor, giving a reliability factor for the sensor, and/or giving a tolerance for the sensor. For example, when a mobile sensor is near one or more other sensors, it could use the other sensor's readings to determine if the mobile sensor reading is accurate. For an accurate reading it could record the sensor readings and take note of the conditions the sensor has gone through since the last calibration (e.g., readings of other sensors, any local weather reports, any comments about the sensor, other messages concerning the sensor, etc.) to develop in the profile the things that are likely not to affect the calibration of the sensor. Alternatively, for an inaccurate reading, it could likewise record the sensor readings and take note of the conditions the sensor has gone through since the last calibration (e.g., readings of other sensors, any local weather reports, any comments about the sensor, other messages concerning the sensor, etc.) to develop in the profile the things that likely to affect the calibration of the sensor.

In an embodiment, a sensor calibration parameter is a collection of information regarding a sensor or sensor type. In an embodiment, a calibration parameter could include comparison of sensor readings, factors that lead to miscalibration, factors that do not lead to miscalibration, longevity information for a senor type, or other information regarding a sensor's reading reliability or calibration. In an embodiment, the calibration parameter comprises reporting the result of the comparing to a computer system.

In an embodiment, where the sensor reading does not match a calibration sensor, the sensor system uses machine learning to determine if the reading of the sensor can be calibrated. In an embodiment, the system determines if the sensor is damaged or malfunctioning and if calibration could correct the reading of the sensor. For example, an oxygen sensor exposed to high sulfur content conditions could provide a lower oxygen reading than is actually present thereafter because the sensor surface is covered in sulfur. Where a small portion of the surface is coated, the reading may be able to be adjusted to account for the coverage and still provide an accurate reading, but a new tolerance or reliability number may also need to be calculated. The sensor system could use previous sensor readings of the oxygen sensor (reduced oxygen reading over time in one case) compared to more reliable oxygen sensor readings and sulfur sensor readings to determine if the oxygen sensor is still viable. In a further example, an oxygen sensor may be able to be calibrated twice, but the sensor would not be reliable after a third calibration because too much of the sensor surface would be covered. In an embodiment, the executing includes displaying a calibration parameter on a screen attached to the sensor system. In an embodiment, the machine learning includes identifying patterns and associations between the at least one calibration sensor and the itinerant sensor based on data associated with an itinerant sensor type.

In an embodiment, the sensor system consults a variety of information to determine the calibration parameters. In an embodiment, the system would use other sensors around the sensor to determine the calibration parameters. In an embodiment, for a mobile thermocouple, the sensor system could consult a reliable thermocouple when the mobile thermocouple is within a confidence range of the reliable thermocouple. For example, if close enough to the reliable thermocouple, the sensor system could use the reliable thermocouple reading for a direct calibration of a mobile sensor.

In an embodiment, the confidence range is a range in which the calibration sensor is considered to be accurate (e.g., within 10 meters). In an embodiment, the confidence range could be several sets of confidence rages, each with a different level of confidence. For example, a first confidence range (or first zone) could be 0-10 meters away from a calibration sensor. The second confidence range (or second zone) could be deemed reliable for direct calibration and data gathering. A second confidence range could be 10-20 meters away from a calibration sensor. The second confidence range could be deemed reliable for data gathering, but not direct calibration. In an embodiment, there are multiple zones for each calibration sensor. For example, each zone could have a different confidence range and be used for different calibration parameters requiring different confidence levels. In an embodiment, the method includes calibrating the itinerant sensor in response to determining the itinerant sensor is within a first range of the at least one calibration sensor, where the one or more calibration parameters is an adjustment to a readout of the itinerant sensor. In an embodiment, the method includes recording itinerant sensor data in response to determining the itinerant sensor is within a second range of the one or more sensors.

In an embodiment of the present disclosure, machine learning is used to compare readings of a calibration sensor to one or more mobile sensors. In an embodiment, the data taken from the calibration sensor and the one or more mobile sensors can be used to calibrate the one or more mobile sensors, get reliability information on the mobile sensors, determine reliability range information of the mobile sensors, calibrate other mobile sensors, determine area sensor readings, and/or determine conditions that lead to inaccuracies in mobile sensor conditions.

In an embodiment, one type or set of mobile sensor (e.g., itinerate sensors) are used to interact with a second set of mobile sensor (i.e., user sensors). For example, itinerate sensors could be mounted on busses that take a fixed path that bring the itinerate sensor close enough to a calibration sensor to calibrate the itinerate sensor. The itinerate sensor readings could then be used to calibrate user sensors that do not go near enough to the calibration sensor for a reliable calibration. In an embodiment, the itinerate sensors and the user sensors are similar, with the difference being that the itinerate sensor has been closer to the calibration sensor. In an embodiment, all cars in an area form a communication network sharing data. In an embodiment, the calibration sensor has a high accuracy and reliability compared to the itinerate sensor or the user sensor, the itinerate sensor has a mid-range accuracy and reliability compared to the calibration sensor and the user sensor, and a user sensor has a low accuracy and reliability compared to the calibration sensor and the itinerate sensor.

In an embodiment, a sensor profile is created for a specific mobile sensor. For example, the mobile sensor profile could include previous mobile sensor readings, previous calibration sensor readings, sensor readings for similar mobile sensors, sensor readings for similar calibration sensors, calibration parameters for other mobile sensors, previous calibration parameters for the mobile sensor, and or other sensor information/data. In an embodiment, a calibration parameter is any parameter related to the calibration of a sensor. For example, the calibration parameter could be an adjustment to the sensor reading, a condition that has led to the miscalibration of a sensor, or other data concerning a sensor.

In an embodiment, a mobile sensor is calibrated when close to a calibration sensor. Referring to FIG. 1, in an embodiment, a calibration sensor 110 is positioned at a position 115. When an itinerate sensor 120 enters a zone 170, a system controlling itinerate sensor 120 calibrates a sensor reading based on a calibration sensor 110 reading. In an embodiment, the calibration is an adjustment to the readout of the sensor or an adjustment to a reliability of the sensor. In an embodiment, an edge of zone 170 is defined by a maximum distance from calibration sensor. In an embodiment, the edge of zone 170 is based on a predetermined distance where a reading of calibration sensor 110 is determined to be valid for a mobile sensor.

In an embodiment, when itinerate sensor 120 is in a zone 175 a reading of both itinerate sensor 120 and calibration sensor 110 will be logged. For example, itinerate sensor 120 could be at a position 132 inside of zone 175.

In an embodiment, when a user sensor 150 is inside of zone 170, user sensor 150 is calibrated by comparison to calibration sensor 110. For example, upon determining that user sensor 150 is inside of zone 170 at a position 160, the sensor reading will be determined to be close enough to calibration sensor 110 that the calibration sensor reading is relevant enough to calibrate the user sensor.

In an embodiment, itinerant sensor 120 is calibrated inside of zone 170 and moves outside of zone 170. For example, itinerant sensor 120 could move from a position 130 to a position 132 or a position 134. In an embodiment, data regarding the change in reading of itinerant sensor 120 is collected. In an embodiment, the collected data is used for determining localized conditions. In an embodiment, the data of previous conditions and resulting inaccuracies or miscalibrations of the conditions could be used to determine inaccuracies or miscalibrations by determining what conditions the itinerate sensor or user sensor have recently experienced. For example, an itinerate sensor may have a history of becoming miscalibrated during extremely cold weather. Machine learning could be used to determine if the conditions make it probable that the sensor is miscalibrated and could suggest a variable rating for the sensor or an alert that the sensor needs to be calibrated.

In an embodiment, the sensor system uses machine learning to analyze data collected from the itinerate sensor and the calibration sensor to calibrate the itinerate sensor. In an embodiment, the sensor system will gather relevant data (for example, sensor readings, service notes, data from a service manual, etc.) and use machine learning diagnostics to analyze the information to determine if the sensor is miscalibrated (i.e., not providing an accurate reading), if it is serviceable, determine conditions that lead to a miscalibration, and determine conditions that did not lead to a miscalibration. For example, a manual could indicate that a thermocouple is not accurate below a certain condition. The sensor system could determine, even if the thermocouple reading is 10° different than the calibrated sensor reading, calibration would not improve the accuracy of the thermocouple until temperatures were warmer.

In an embodiment, the collected data is used for determining the temperature in different locations, and the data is then used in turn to calibrate sensors. For example, the collected data could be used for generating a local weather map based on temperature. For example, the data could be used for generating a map based on smog conditions. In an embodiment, the data could be used, with other data, for determining how accurate the itinerate sensor or user sensor is and what conditions lead to inaccuracies or miscalibrations.

Using Itinerate Sensor to Calibrate User Sensors

In an embodiment, the itinerate sensor is used to calibrate the user sensor. In an embodiment, itinerate sensor 120 is calibrated inside of zone 170 (for example at position 130) using readings from calibration sensor 110 at a position 115. Itinerant sensor 120 will then travel to a position (for example, position 132 or position 134) close enough to user sensor 150 to communicate with sensor 150 for a calibration and within an acceptable physical distance. In an embodiment, the acceptable physical distance could be a distance in which the itinerate sensor reading is considered relevant (i.e., close enough where the itinerate sensor reading should be approximately the same as the user sensor reading). In an embodiment, the calibration points (for example, 132 and 162) would be within zone 175 and a relevant distance away from calibration sensor 110, and would be used in conjunction with a reading from itinerate sensor 120 to calibrate user sensor 150.

In an embodiment, the itinerate sensor is used to determine if a user sensor needs to be calibrated. In an embodiment, a calibrated itinerate sensor could communicate with a user sensor at a point outside of zone 170. For example, itinerate sensor 120 at position 132 could communicate with user sensor 150 at position 162, or itinerate sensor 120 at position 134 could communicate with user sensor 150 at position 164. In an embodiment, a sensor (such as user sensor 150) is determined to be miscalibrated when its reading does not match the calibration sensor 110. For example, where user sensor 150 and calibration sensor 110 are thermocouples, user sensor 150 reading could be 60° C. and calibration sensor 110 reading could be 71° C. Where the miscalibration threshold is 10° C., the sensor would be deemed miscalibrated since the gap between the two sensors is more than 10° C. In an embodiment, when the user sensor reading is determined to be miscalibrated, it would be determined that the user sensor needs updating (e.g. calibrating). For example, after determining that the user sensor needs to be calibrated, a computer system could alert a user that the sensor is miscalibrated and direct the user to a calibration zone such as zone 170.

In an embodiment, sensor readings at relative positions of itinerate sensor 120 and user sensor 150 could be used in conjunction with calibration sensor 110 readings to develop calibration parameters. For example, readings (e.g., temperature, oxygen, infrared, or any other sensor reading) of calibration sensor 110 at position 115, itinerate sensor 120 at position 130, user sensor 150 at position 160, itinerate sensor 120 at position 132, user sensor 150 at position 162, itinerate sensor 120 at position 134, and user sensor 150 at position 164 could be compared to determine one or more calibration parameters (e.g., what conditions lead to the miscalibration of user sensor 150). In an alternative example, readings (e.g., temperature, oxygen, infrared, or any other sensor reading) of calibration sensor 110 at position 115, itinerate sensor 120 at position 130, user sensor 150 at position 160, itinerate sensor 120 at position 132, user sensor 150 at position 162, itinerate sensor 120 at position 134, and user sensor 150 at position 164 could be used for machine learning to determine how to generate calibration parameters.

In an embodiment, user sensor 150 is calibrated using calibration sensor 110 when in zone 170, but user sensor 150 is not calibrated using calibration sensor 110 when in zone 175 and not in zone 170. In an embodiment, readings from calibration sensor 110 are recorded to determine calibration parameters for user sensor 150, but not to directly calibrate user sensor 150. For example, readings could be used for long term data analysis to determine when a calibration is needed, what conditions lead to miscalibration, and how environmental conditions affect reading tolerances. In an embodiment, machine learning is used to determine what conditions affect the readouts of sensors by monitoring data and using structured and unstructured resources. For example, modifying the sensor system (e.g., a computer controlling the sensor system) by using machine learning to modify the sensor systems methods or adjusting sensor algorithms based on a feedback loop of data and information could increase the accuracy of sensor modeling or sensor control.

Figure 2:
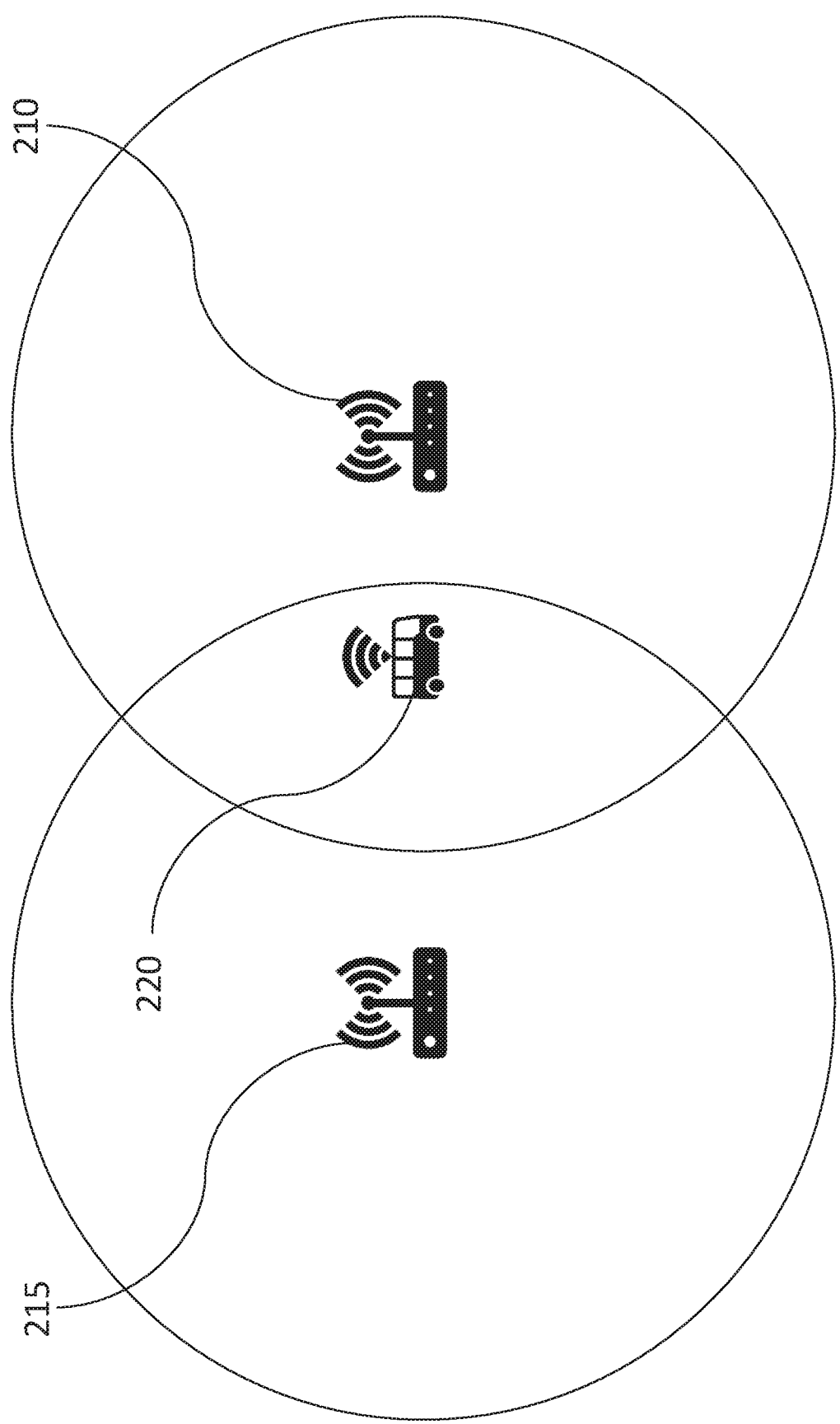
FIG. 2 depicts a diagram of an example sensor system, in accordance with an exemplary embodiment.

Referring to FIG. 2, in an embodiment, a mobile sensor 220 could connect to two calibration sensors 215 and 210. In an embodiment, a computer system linked to mobile sensor 220 could use a first set of information from calibration sensor 215 and a second set of information from calibration sensor 210 to calibrate mobile sensor 220. For example, calibration sensor 215 could provide temperature information to mobile sensor 220 and calibration sensor 210 could provide carbon monoxide reading information to mobile sensor 220. The computer system could use the two sensor readings, possibly in conjunction with a sensor profile for mobile sensor 220, to calibrate mobile sensor 220. In an alternative example, calibration sensor 215 could provide a first temperature reading to mobile sensor 220 and calibration sensor 210 could provide a second temperature reading to mobile sensor 220. Mobile sensor 220 (i.e. a computer system controlling mobile sensor 220), could use the average of the readings from calibration sensor 210 and 215 to develop calibration parameters.

Figure 3:
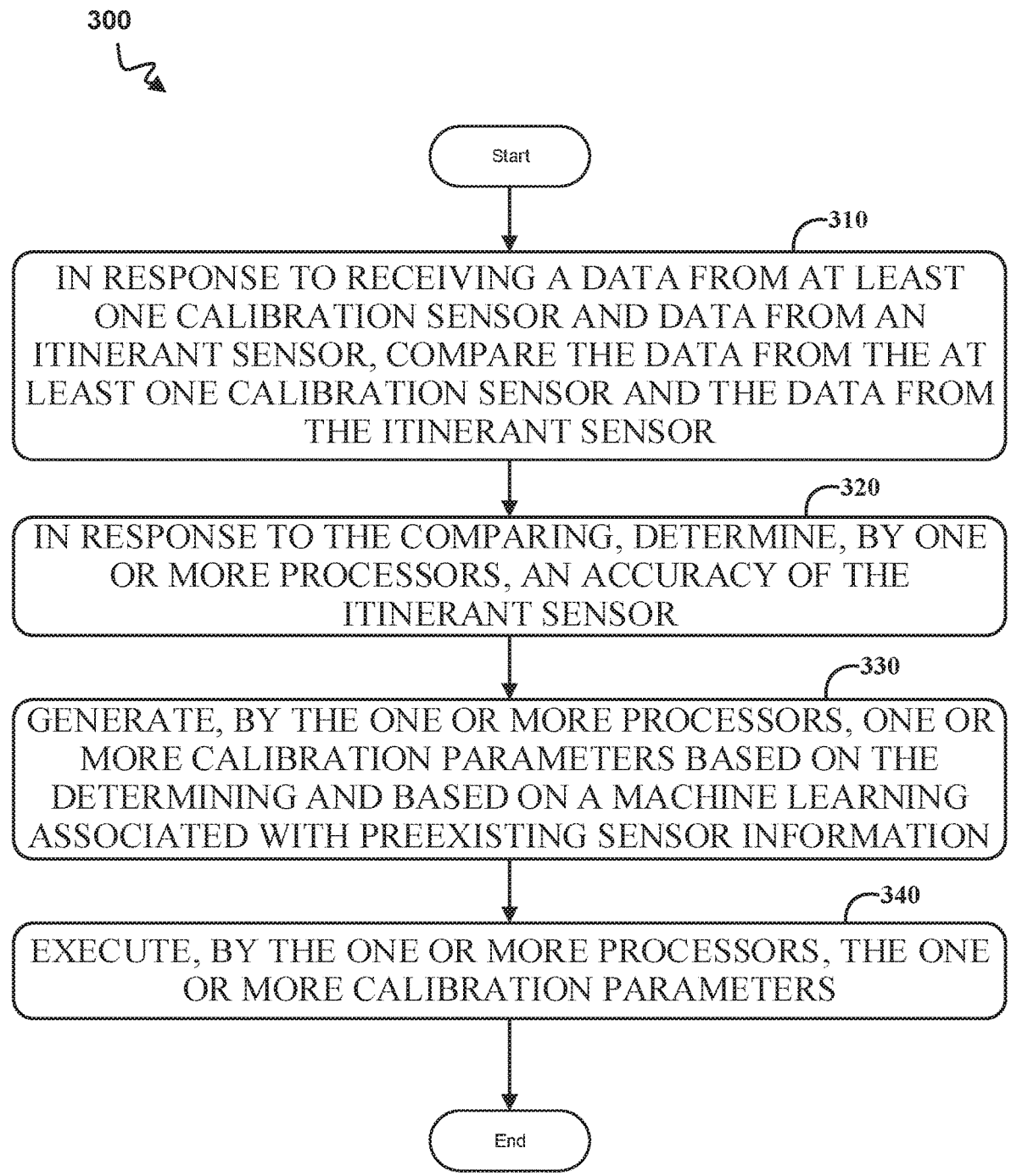
FIG. 3 depicts a flow diagram, in accordance with an exemplary embodiment of the present invention.

Referring to FIG. 3, in an exemplary embodiment, the present invention is configured to perform an operation 310 of in response to receiving a data from at least one calibration sensor and data from an itinerant sensor, comparing the data from the at least one calibration sensor and the data from the itinerant sensor, an operation 320 of in response to the comparing, determining, by one or more processors, the accuracy of the itinerant sensors, an operation 330 of generating, by the one or more processors, one or more calibration parameters based on the determining and based on a machine learning associated with preexisting sensor information, and an operation 340 of executing, by the one or more processors, the one or more calibration parameters.

Cognitive Sensor Analysis and Machine Learning

In an embodiment, a cognitive sensor analysis module analyzes a mixture of formal and informal sources and uses cognitive sensor techniques to draw out specific information. For example, the following cognitive analytic techniques could be used alone or in conjunction with others: relationship extraction, self-learning calibration, contextual information (location, weather, time, season, etc.) input analysis, and dynamically generating and updating the calibration model in the sensor system thru the self-learning process. Generally, use of these techniques will be called sensor information processing (SIP). SIP is cognitive machine learning for the analysis of unstructured sensor data to identify differences in the sensor readings, drawing conclusions from those readings, and generating future sensor profiles and/or calibration parameters. In an embodiment, SIP is used to determine how to calibrate a mobile sensor when the sensor is within a zone of the calibration sensor. In an embodiment, SIP is used to generate a sensor profile to determine when a sensor needs to be calibrated and/or what conditions lead to a sensor needing to be calibrated. In an embodiment, SIP is used to generate profiles for sensor types that can be used to calibrate other sensors of the same or similar types and determine when other sensors of the same or similar type need to be calibrated.

Aspects of the present disclosure relate to cognitive sensor analysis systems, and more specifically, to identifying calibration parameters for sensors. While the present disclosure is not necessarily limited to such applications, various aspects of the disclosure could be appreciated through a discussion of various examples using this context. In one embodiment, one or more processors is included in an SIP system.

In an embodiment, sources of information in an SIP system information repository include: current and previous sensor readings from sensors linked to the SIP system, and historical data from other sensors and environmental relationships to those other sensors.

Machine learning paradigms, cognitive data/information processing, pattern classification or pattern recognition, regression methods, artificial or computational intelligence, data mining, statistical data analysis, computational learning, and cognitive machines, etc., are methods capable of sorting objects into classes. These algorithms extract features or attributes from a data source and use them for classification. For example, an aspect of various machine learning procedures is the acquisition of training data, which could include the use of supervised, unsupervised, or hybrid learning techniques. For example, the predictive models could include appropriate supervised learning algorithms (such as regression models, artificial neural networks, and support vector machines) and statistical classifiers, trained on data from the knowledge base, which can include objects presented to the classifier whose classes are known. Using predictive models enable the classifier to then identify the characteristics, models, and clusters according to class (e.g., by finding the cluster which most closely corresponds to the features extracted from the object). As a particular example, an AI engine could be configured to use SIP to identify one or more ambient conditions that lead to sensor miscalibration. The one or more ambient conditions could be used to determine when a sensor is not giving an accurate reading and/or when the sensor needs to be calibrated.

Sensor Information Processing

Figure 4:
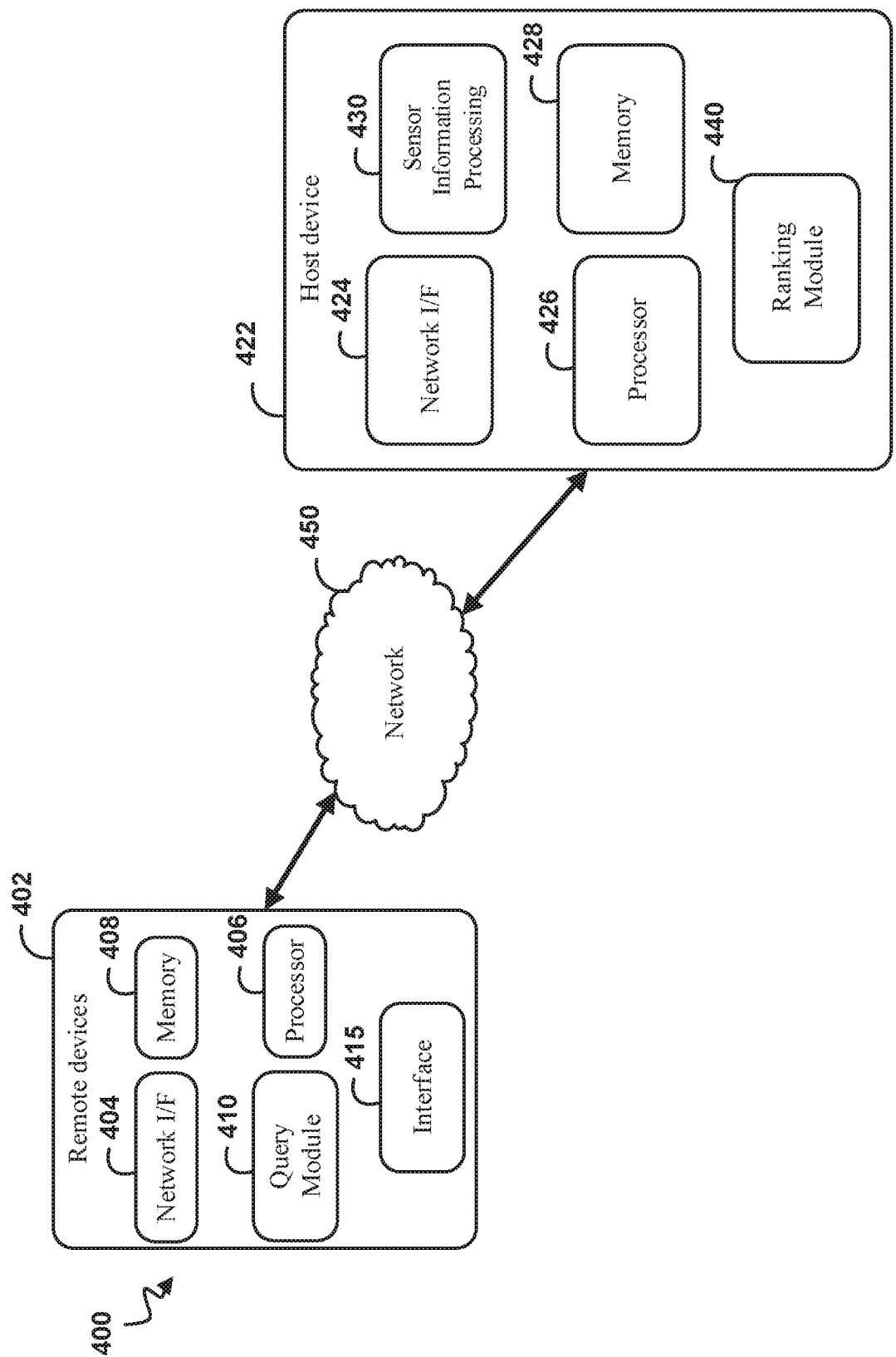
FIG. 4 is a block diagram of an example sensor information processing (SIP) system, according to embodiments.

FIG. 4 is a block diagram of an example computing environment 400, consistent with an embodiment of the present disclosure. In an embodiment, computing environment 400 includes one or more remote devices 402 (e.g., sensors with attached computing devices) and one or more host devices 422 (e.g., SIP systems). In an embodiment, remote device 402 and host device 422 are distant from each other and communicate over a network 450 in which host device 422 includes a central hub from which remote device 402 can establish a communication connection. In an embodiment, host device 422 and remote device 402 are configured in any suitable relationship (e.g., in a peer-to-peer or other relationship).

In an embodiment, network 450 is implemented by any number of any suitable communications media (e.g., wide area network (WAN), local area network (LAN), internet, intranet, etc.). In an alternative embodiment, remote device 402 and host device 422 are local to each other, and communicate via any appropriate local communication medium (e.g., LAN, hardwire, wireless link, intranet, etc.). In an embodiment, one or more cloud computing services implement network 450 within a cloud computing environment. In an embodiment, a cloud computing environment includes a network-based, distributed data processing system that provides one or more cloud computing services. In a further embodiment, the cloud computing environment includes many computers disposed within one or more data centers and configured to share resources over network 450.

In an embodiment, host device 422 includes an SIP system 430. As described herein, an "SIP system" is one or more computing devices that performs SIP associated with sensor input (e.g., calibration sensor reading and mobile sensor reading) and/or SIP associated with data store content (e.g., sensor data within an information repository). In an embodiment, SIP is the ability of a computing device(s) to process, understand, analyze, and/or generate sensor calibration parameters (e.g., conditions that lead to miscalibration, factors that lead to miscalibration, etc.). In an embodiment, the method includes profiling, by the one or more processors, historical sensor readings for one or more sensors. For example, sensor readings could include readings from the sensor itself and readings from other sensors during the same time periods. Host device 422 further includes a memory 428 and a profiling module 440. In an embodiment, profiling module 440 is computer-readable program instructions that are stored within memory 428 configured to identify, score, and rank sensor information based on the degree of correlation, as described in more detail below. In an embodiment, profiling module 440 is part of SIP system 430. In an embodiment, the method includes profiling, by profiling module 440, sensor information relating to one or more sensors for the development of a sensor profile.

In an embodiment, remote device 402 enables devices to transmit information (e.g., sensor reading and ambient conditions) to host device 422 to relate one or more sensor readings for the development of a sensor profile. For example, remote device 402 could include a query module 410 (e.g., in the form of a web browser or any other suitable software module) and present a graphical user interface (GUI) or other interface (e.g., command line prompts, menu screens, etc.) to solicit queries from users for submission to one or more host devices 422 and to display answers/results obtained from host devices 422 in relation to such user queries. In an embodiment, "user" means a computing device requiring calibration information on a sensor. In an embodiment, "user" means a human requiring calibration information on a sensor. In an embodiment, remote device 402 prompts users for additional information to further narrow down the profile generated for the sensor. For example, if host device 422 receives data stating "report reliability information for a sensor" remote device 402 could query users for information regarding other sensors controlled by the user. For example, a sensor reading that smog in an area is high indicate a temperature sensor less reliable due to the smog conditions. After receiving the information, host device 422 could generate appropriate profile information and calibration parameters for the sensor.

In an embodiment, host device 422 and remote device 402 are computer systems. In an embodiment one or more of host device 422 and remote device 402 are equipped with a display or monitor. The computer systems also include at least one of a processor 406, a processor 426, a memory 408, a memory 428, an user interface 415, an internal or external network interface or a communications device 404 (e.g., modem, network cards, etc.), internal or an external network interface 424, an optional input devices (e.g., a keyboard, mouse, or other input device), and any commercially available or custom software (e.g., browser software, communications software, server software, SIP software, search engine and/or web crawling software, filter modules for filtering content based upon predefined criteria, etc.). In an embodiment, the computer systems include servers, desktops, laptops, and hand-held devices (e.g., mobile phones, touch pads, smart watches, vehicle computer systems, etc.).

Figure 5:
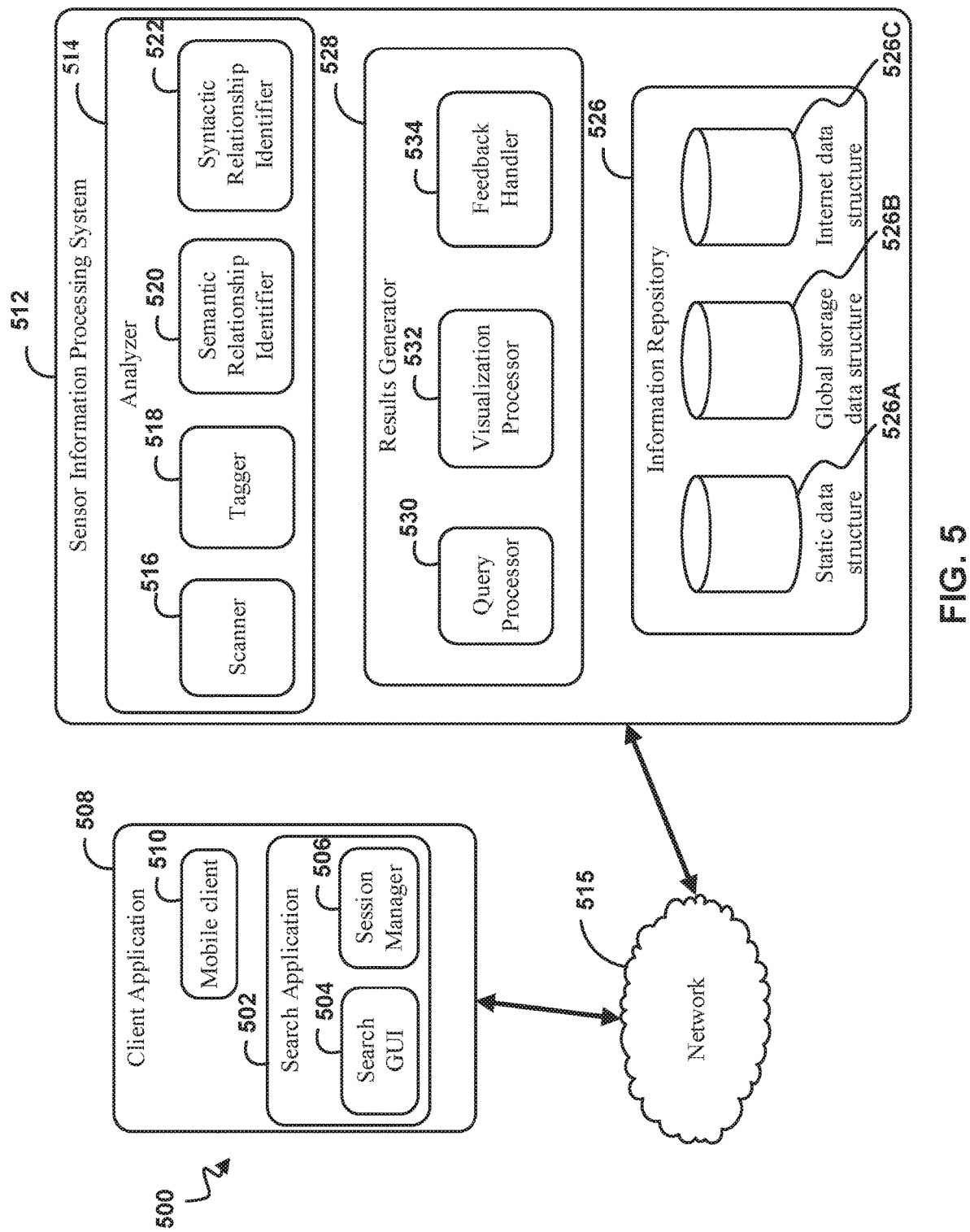
FIG. 5 is a block diagram of an example SIP system, according to embodiments.

In an embodiment, FIG. 5 is a block diagram of an example SIP system 512 located within a computing environment 500. In an embodiment, SIP system 512 is configured for identifying one or more parameters based on sensor data. In an embodiment, SIP system 512 is configured for identifying one or more calibration parameters based on sensor data. In an embodiment, one or more users can send requests for information to SIP system 512 using a remote device (such as remote device 402). For example, such a remote device could include a client application 508 which could itself involve one or more entities operable to generate information that the remote device dispatches to SIP system 512 via network 515. In an embodiment, SIP system 512 is able to perform methods and techniques for responding to the requests sent by a client application 508. In an embodiment, the information received at SIP system 512 corresponds to input project information/data received from users, where the input is expressed in free form and in natural language. For example, previous readings could be historical readings from the calibration sensor and mobile sensor, readings just taken from the calibration sensor and mobile sensor, previous readings from other sensors, service notes, sensor manuals, error reports, etc.

In an embodiment, a query or input (e.g., initiating a calibration) is one or more words that form a search term or request for data, information, or knowledge. In an embodiment, the input is expressed in the form of one or more keywords. In an embodiment, input includes various selection criteria and search terms (i.e., carbon dioxide sensor exposed to heat). For example, an input could be composed of complex sensor readings, trends of sensors under a set of conditions, or sensor calibration parameters. In an embodiment, a keyword-based search for answers to the inputs could also be possible. In an embodiment, using restricted syntax for questions posed by users is enabled. The use of restricted syntax results in a variety of alternative expressions that assist users in better stating their needs or limiting their search to available sensor profiles. For example, when a temperature sensor is malfunctioning, the sensor system could suggest the names of certain types of thermocouples, similar to the sensor in question, to narrow search. Additionally, the system could also suggest keywords to exclude (e.g., names of thermocouples that are not based on the same principal as the thermocouple in question)

In an embodiment, client application 508 operates on a variety of devices. Such devices include, but are not limited to, mobile and handheld devices (e.g., vehicles, laptops, mobile phones, personal or enterprise digital assistants, and the like), personal computers, servers, or other computer systems that access the services and functionality provided by SIP system 512. In an embodiment, client application 508 includes one or more components, such as a mobile client 510. In an embodiment, mobile client 510, acting as an agent of client application 508, dispatches user query requests to SIP system 512.

In an embodiment, client application 508 also includes a search application 502, either as part of mobile client 510 or separately. Search application 502 performs several functions, including some or all of the functions of mobile client 510 listed above. For example, search application 502 dispatches requests for information, such as particular sensor profiles and/or calibration parameters, to SIP system 512. In an embodiment, search application 502 is a client application to SIP system 512. Search application 502 sends requests for candidate results to SIP system 512. Search application 502 is installed on a personal computer, a server, or other computer system.

In an embodiment, search application 502 includes a search GUI 504 and a session manager 506. In such situations, sensor computer systems enter input terms in search GUI 504. In an embodiment, search GUI 504 is a search input tool or other GUI component, the content of which represents input to be submitted to SIP system 512. In an embodiment, sensor computer systems authenticate to SIP system 512 via session manager 506. In an embodiment, session manager 506 keeps track of sensor computer system activity across sessions of interaction with SIP system 512. In an embodiment, session manager 506 also keeps track of what inputs (e.g., data sources) a sensor computer system submits within the lifecycle of a session of the sensor computer system. For example, session manager 506 could retain the data sources across several sessions (e.g., "email servers, project files, etc."). In an embodiment, SIP system 512 produces preexisting sensor profiles, preexisting calibration parameters, new sensor profiles and/or new calibration parameters, in response to a sensor computer system input. In an embodiment, information for sessions managed by session manager 506 is shared between computer systems and devices. In an embodiment, a sensor computer system is a system performing the analysis of the sensor or runs client application 508.

In an embodiment, client application 508 and SIP system 512 are communicatively coupled through network 515 (e.g., the internet, intranet, or other public or private computer network). In an embodiment, SIP system 512 and client application 508 communicate by using hypertext transfer protocol (HTTP), representational state transfer (REST) calls, or any other suitable protocol. In an embodiment, SIP system 512 resides on a server node. Client application 508 establishes server-client communication with SIP system 512 or vice versa. In an embodiment, network 515 is implemented within a cloud computing environment, or using one or more cloud computing services.

In an embodiment, consistent with various other embodiments, SIP system 512 responds to the requests for information sent by client application 508 (e.g., a calibration request). In an embodiment, SIP system 512 then obtains a set of one or more readings from mobile sensors with the same or similar requirements and one or more calibration parameters derived from the one or more readings from the mobile sensors. In an embodiment, SIP system 512 then obtains a set of one or more readings from mobile sensors with the same or similar requirements and one or more factors surrounding a miscalibration in the mobile sensors. In an embodiment, the one or more mobile sensors is not the same type of sensor as a client application sensor, but has one or more similar characteristics of the client application 508 sensor. For example, the SIP system could collect a set of readings from a mobile sensor, and other sensors in its vicinity. The SIP system could also collect other data related to the sensor such as manuals, error reports for similar sensors, sensor profiles for other sensors, research reports, etc. The SIP system could then collate the data and determine the likely source of the sensor miscalibration, malfunction, or damage using machine learning paradigms discussed in this disclosure.

In an embodiment, SIP system 512 includes an analyzer 514, an information repository 526, and a result generator 528. Analyzer 514 is a computer module (e.g., SIP module) that analyzes the received input. Analyzer 514 performs various methods and techniques for analyzing structured data (e.g., data from databases), unstructured data (e.g., data from a web page), and/or statistical data (e.g., spreadsheets, ranges, graphs, etc.). For example, analyzer 514 utilizes syntactic analysis and semantic analysis, as described below.

In an embodiment, analyzer 514 parses passages of documents, such as downloaded data sheets. In an embodiment, analyzer 514 includes various modules to perform analyses of received inputs. For example, analyzer 514 could include, but is not limited to, computer modules: a scanner 516, tagger 518, a semantic relationship identifier 520, and a syntactic relationship identifier 522.

In an embodiment, scanner 516 is a computer module that performs analysis of a sensor in comparison to sensor data. Scanner 516 converts a sequence of data and other sensor information (manuals, error reports, articles on the sensor) regarding a sensor into tokens for later analysis. In an embodiment, scanner 516 receives a string of data, identifies the patterns in the string, and categorizes them into tokens. In an example illustration, in order for SIP system 512 to generate a sensor profile with one or more environmental conditions, scanner 516 could first parse data (received from the sensor or from an outside source), and scanner 516 could then divide those requirements into profiles or parameters.

In an embodiment, tagger 518 is a computer module that marks up a data set that relates to a particular sensor or sensor condition (e.g., error reports, sensor readings, sections of a manual, etc.). Tagger 518 analyzes a particular data set or a section of data and tags sensors and sensor conditions with a token. Tagger 518 determines which data sets or sections corresponds to various sensor conditions. In an embodiment, a sensor condition might correspond to another a simultaneous reading of the sensor or another sensor.

In an embodiment, the sensor reading is related to one or more previously analyzed sensor readings (e.g., sensor readings of a mobile sensor over time or the reading of a calibration sensor). In an embodiment, tagger 518 could tag or otherwise annotate tokens for specific sensor triggers or conditions. In an embodiment, tagger 518 tags tokens or sections of data to be parsed by SIP system 512.

In an embodiment, semantic relationship identifier 520 is a computer module that identifies semantic relationships and/or domains of recognized data. For example, sensors that share a same semantic class could share one or more attributes associated with a broader category. In an embodiment, semantic relationship identifier 520 determines functional dependencies between entities and other semantic relationships. For example, if SIP system 512 obtains a gap reading between a calibration sensor and a mobile sensor at the same time as a reading of a tertiary sensor, semantic relationship identifier 520 could group the gap (difference between mobile sensor reading and calibration sensor readings) with the reading of the tertiary sensor in conjunction with other data (such as error reports or research on similar sensors) to develop calibration parameters for the mobile sensor. In an embodiment, grouping into particular classes is useful for SIP system 512 to utilize ontologies in order to find conditions leading to sensor miscalibrations.

In an embodiment, syntactic relationship identifier 522 is a computer module that identifies syntactic relationships in a passage composed of tokens. Syntactic relationship identifier 522 determines relative associations and patterns between sensor readings (i.e., sensor readings for the same sensor, sensor readings of similar sensors, and sensor readings of other types of sensors). For example, which sensor readings record conditions that will have an effect on other sensors.

In an embodiment, analyzer 514 is a computer module that can parse a received sensor computer system query and generate a corresponding data structure of the sensor computer system query. For example, in response to receiving an input at SIP system 512, analyzer 514 could output a parsed sensor profile and/or calibration parameter as a data structure. In an embodiment, a parse tree or other graph structure represents the parsed output. To generate the parsed output, analyzer 514 triggers computer modules 516, 518, 520, and 522. Additionally, in an embodiment, analyzer 514 uses external computer systems for dedicated tasks that are part of the parsing process. In an embodiment, analyzer 514 and/or result generator 528 are program modules located within a memory (such as memory 428). In an embodiment, a sensor computer system is any computer system that analyzes sensor data and does not have to be connected to a sensor. In an embodiment, sensor computer system could be a cloud computing system or a computer controlled through a cloud network cloud.

In an embodiment, result generator 528 is a computer module that generates new calibration parameters or obtains preexisting calibration parameters. Examples of calibration parameters generated or obtained by result generator 528 could include, but are not limited to, actual adjustments to sensor readings, reading tolerances, calibration triggering conditions, and the like.

In an embodiment, search application 502 uses the output of analyzer 514 to perform a search of a set of data to retrieve one or more calibration parameters in response to an input (e.g., sensor reading). In an embodiment, the set of data refers to one or more data sources can be sensor readings from any sensor that aids in generating a calibration parameter. In an example illustration, if an oxygen sensor is consistently coming in slightly miscalibrated and the sensor is regularly in a high humidity environment," search application 502 then searches within the repositories (e.g., information repository 526) and locates various uploaded oxygen sensor profiles and/or calibration parameters that have had a "high humidity" parameter (or its synonym) and SIP system 512 generates a new sensor profile and/or calibration parameter for the current sensor based on the information. Accordingly, SIP system 512 returns to the sensor computer system both previously taken and new data readings. Thus, for example, a sensor computer system could analyze the results and compare the results to previous readings.

In an embodiment, data sources include: one or more data warehouses, one or more information repositories (e.g., information repository 526), one or more data models, one or more multimedia files, and one or more document repositories. Information repository 526 enables data storage and retrieval. In an embodiment, information repository 526 is a storage mechanism that houses a standardized, consistent, clean, and integrated form of potential data sets. In an embodiment, information repository 526 includes various data stores or data structures, such as a static data structure 526A, a global storage data structure 526B, and an internet data structure 526C.

In an embodiment, a processor maps each particular sensor type to a class of sensor in order to identify suitable calibration parameters. In an embodiment, subject matter experts (SMEs) will map particular sensor classes.

In an embodiment, SMEs assign particular sensor types to particular sensor classes and store that information within information repository 526 or a specific data structure (for example, 526A, 526B, 526C, or another database). For example, a SME could assign particular sensors into classes such as temperature, CO2 detection, infrared, etc. based on the knowledge and experience of the SME. In an example, if a particular sensor reading gap between a mobile sensor and a calibration sensor is determined, SIP system 512 could first determine the class of the mobile sensor. In an embodiment, SIP system 512 then scans the sensor class to find candidate calibration parameters assigned to the same sensor class. Accordingly, SIP system 512 ranked each calibration parameter based on the relative importance of each calibration parameter for any given sensor reading.

In an embodiment, one or more of the data structures, for example static data structure 526A, global storage data structure 526B, and internet data structure 526C, are combined into one data structure. In an embodiment, each of the data structures correspond to different computing devices. For example, for a cloud computing environment, SIP system 512 could derive sensor profile information corresponding to static data structure 526A from a first server, miscalibration factors corresponding to global storage data structure 526B from a second server, and one or more calibration parameters corresponding to internet data structure 526C from a third server.

In an embodiment, result generator 528 includes a query processor 530, a visualization processor 532, and a feedback handler 534. When information in information repository 526 or other data source that matches a parsed input is located, query processor 530 executes a technical query. Based on data retrieved by a technical query executed by query processor 530, visualization processor 532 is able to render visualization of the retrieved data, where the visualization represents the newly generated calibration parameters and previously generated calibration parameters. In an embodiment, visualization processor 532 renders various analytics to represent the calibration parameter including, but not limited to, images, charts, tables, dashboards, maps, and the like. In an embodiment, visualization processor 532 presents sensor profiles and calibration parameters to the sensor computer system.

In an embodiment, feedback handler 534 is a computer module that processes feedback from sensor computer systems on calibration parameters generated by result generator 528. In an embodiment, sensor computer systems engage in dialog with SIP system 512 to evaluate the relevance of sensor profiles and the resulting calibration parameters. Result generator 528 produces a list of calibration parameters in response to an input (e.g., sensor data) by a sensor computer system. A sensor computer system (e.g., SME) ranks and scores each calibration parameter according to its relevance to the input. In an embodiment, feedback handler 534 uses the feedback of sensor computer systems on generated answers for future sessions.

Figure 6:
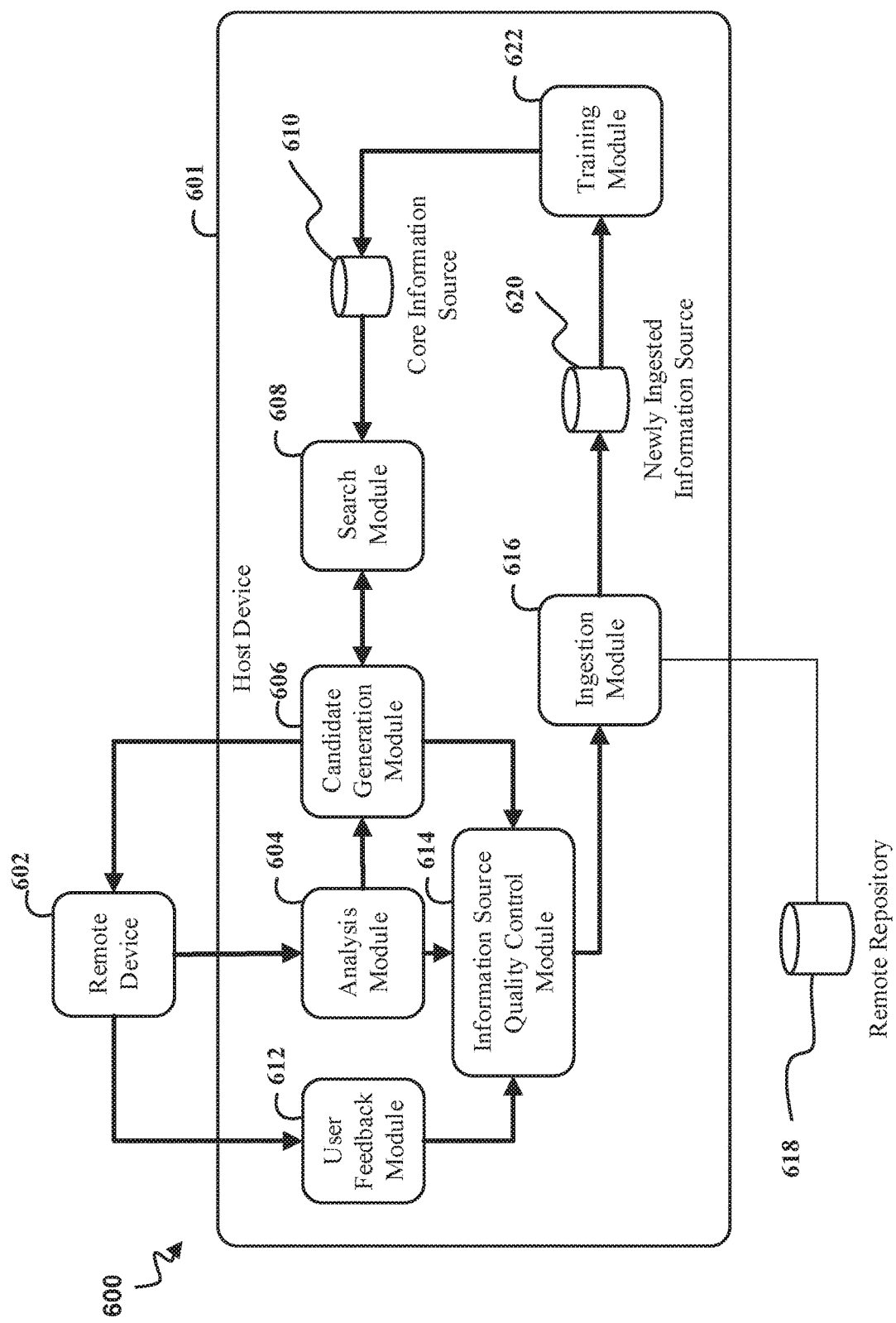
FIG. 6 is a block diagram of an example high level logical architecture of an SIP system, according to embodiments.

In an example, FIG. 6 illustrates a block diagram of an example high level logical architecture of an SIP system 600, according to an embodiment. Aspects of FIG. 6 are directed toward components and modules for use with a cognitive computing system. In an embodiment, host device (training module 622) and remote device 602 embody a host device 601 and a remote device 602 respectively. In an embodiment, an analysis module 604, located on host device 601, receives sensor inputs, such as a list of previous sensor readings, sensor profiles, and resulting calibration parameters, from remote device 602, and can analyze the input to produce information about the input (e.g., provide expanded list of preexisting and newly generated calibration parameters). For example, components such as scanner 516, tagger 518, semantic relationship identifier 520, and syntactic relationship identifier 522 could perform the analyzing. The information produced by analysis module 604 includes, for example, the semantic category of each sensor input.

Next, in an embodiment, a candidate generation module 606 formulates queries (e.g., sensor conditions or readings) from the output of analysis module 604 and then passes these queries on to a search module 608 which consults various resources (e.g., previous sensor readings, sensor data repositories, calibration parameters repositories, etc.) to retrieve relevant information. As used herein, documents refer to various types of written, printed, or electronic media (including passages, web-pages, database files, multimedia, etc.) that provide information or evidence. As illustrated in FIG. 6, search module 608 consults a core information source 610. In an embodiment, a core information source refers to any document or group of documents or data that an SIP system could use to obtain preexisting sensor profiles or calibration parameters and generate new sensor profiles or calibration parameters from the list of preexisting sensor profiles or preexisting calibration parameters. Candidate generation module 606 extracts, from the search results obtained by search module 608, candidate sensor profiles and/or calibration parameters, which it then scores (e.g., with confidence scores) and ranks according to the comparability, as described in more detail below. Candidate generation module 606 sends a final list of generated sensor profiles and/or calibration parameters, based on a comparison of various confidence scores associated with the generated sensor profiles and/or calibration parameters, to remote device 602 for presentation to the sensor computer system. In an additional embodiment, candidate generation module 606 also sends information about generated sensor profiles, calibration parameters, and/or confidence scores to an information source quality control module 614. A sensor computer system (e.g., a SME) responds, via remote device 602, to generate or alter provided sensor profiles and/or calibration parameters (e.g., input a query that specifies how specific sensor profile and/or calibration parameter should be grouped) through a sensor computer system feedback module 612. In an embodiment, sensor computer system feedback module 612 then provides feedback to information source quality control module 614.

In an embodiment, information source quality control module 614 compiles and analyzes information that information source quality control module 614 receives during the course of normal operations of SIP system 600. Information source quality control module 614 could use received information (e.g., information from analysis module 604, candidate generation module 606, and sensor computer system feedback module 612) to determine whether or not one or more new information sources should be ingested. When the information source quality control module 614 determines that information source quality control module 614 needs a new information source having certain characteristics (e.g., a new calibration parameter is uploaded), information source quality control module 614 instructs an ingestion module 616 accordingly. Based on these instructions, ingestion module 616 searches one or more remote sources, such as a remote repository 618, in an attempt to locate one or more suitable new information sources. In an embodiment, once discovered, these new information sources are ingested by ingestion module 616 and become a newly ingested information source 620. The new information sources are in turn analyzed by a training module 622. In an embodiment, training analysis takes the form of obtaining training candidate sensor profiles and/or calibration parameters from sensor computer system inputs using newly ingested information source 620 and then reviewing the quality of generated candidate sensor profiles and/or calibration parameters. In an embodiment, SIP system 600 uses training candidate sensor profiles and/or calibration parameters for either (1) reviewing or determining the quality or characteristics of an information source used to identify training candidate sensor profiles and/or calibration parameters, (2) creating or refining machine learning models and routing paths usable by SIP system 600, or both. In an embodiment, once newly injected information source 620 meets a threshold level of confidence, it is combined with core information source 610 and used to generate sensor profiles and/or calibration parameters based on input from sensor computer systems.

In an embodiment, SIP system 600 uses the various components and modules of the exemplary high level logical architecture for an SIP system described above to implement various aspects of the present disclosure. For example, SIP system 600 could use analysis module 604 to receive a set of inputs from a sensor computer system, such as a list of requirements. In an embodiment, SIP system 600 could use candidate generation module 606 and search module 608 together to perform searches of core information source 610, generate new sensor profiles and/or calibration parameters, calculate confidence scores associated with the new sensor profiles and/or calibration parameters, and provide the generated sensor profiles and/or calibration parameters to one or more use sensor profiles and/or calibration parameters to one or more sensor computer systems. In an embodiment, SIP system 600 could use information source quality control module 614 to analyze confidence scores and determine whether or not the confidence scores fail to meet one or more confidence criteria. Further, in an embodiment, SIP system 600 could use ingestion module 616 to ingest new information sources (in response to an indication from information source quality control module 614 that confidence criteria has not been satisfied).

In an embodiment, the analyzing of sensor data includes capturing sensor data through cognitive analysis. The capture of information combines both formal sensor profiles and/or calibration parameters with informal conversational-style inputs to build up a full understanding of sensor requirements. For example, the sources could include formal sensor profile documents such as; prior sensor readings, current sensor readings, previously compiled sensor readings, previously compiled sensor profiles, and/or previously compiled calibration parameters. In one embodiment, an SIP module analyzes the mixture of formal and informal sources which use cognitive sensor techniques to draw out specific calibration parameters for each sensor profile.

Computer System

Figure 7:
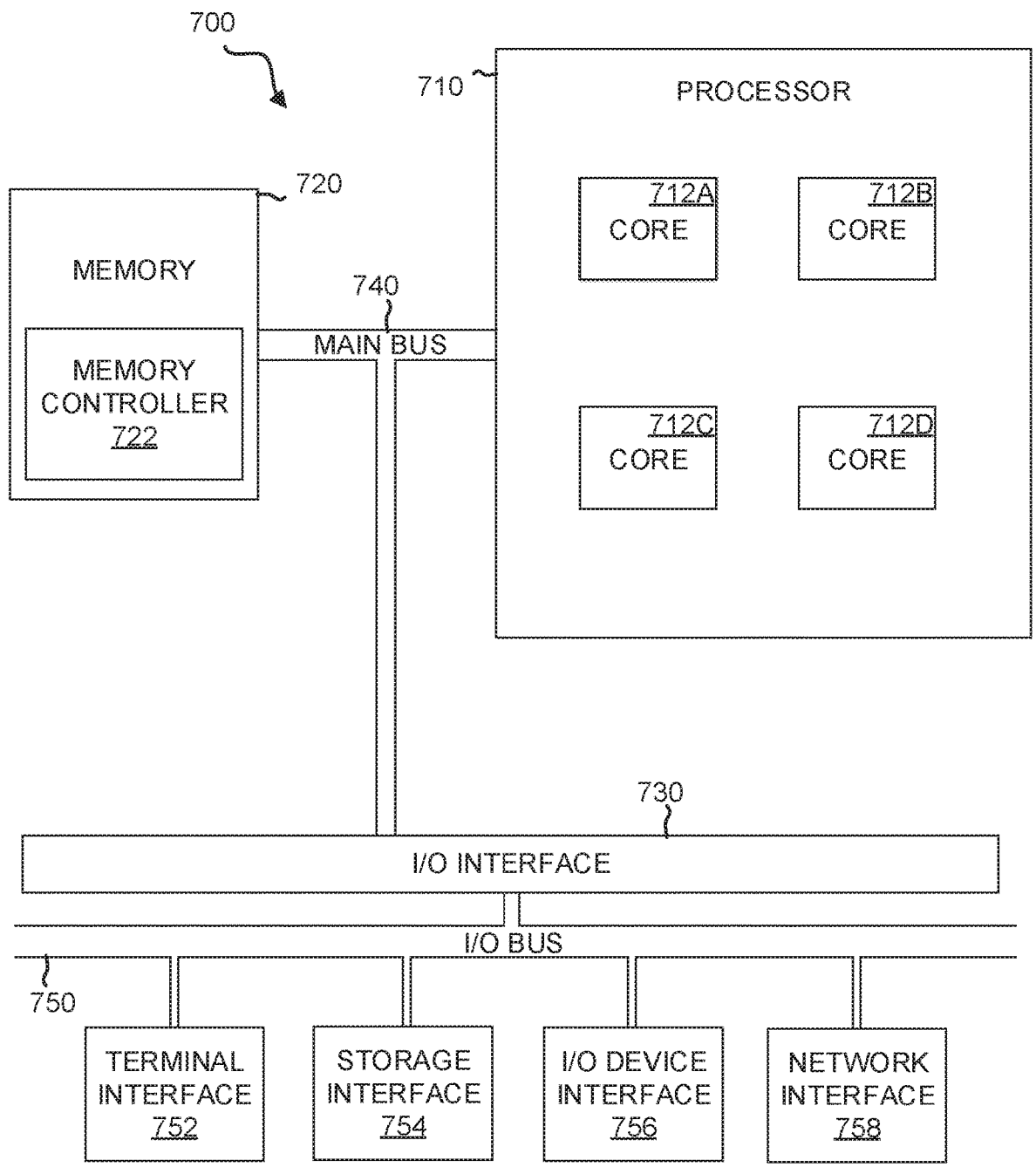
FIG. 7 depicts the representative major components of an example computer system that may be used, in accordance with an exemplary embodiment of the present invention.

In an exemplary embodiment, the computer system is a computer system 700 as shown in FIG. 7. Computer system 700 is only one example of a computer system and is not intended to suggest any limitation as to the scope of use or functionality of embodiments of the present invention. Regardless, computer system 700 is capable of being implemented to perform and/or performing any of the functionality/operations of the present invention.

In an embodiment, FIG. 7 depicts the representative major components of example computer system 700. It is appreciated that individual components could vary in complexity, number, type, and\or configuration. The particular examples disclosed are for example purposes only and are not necessarily the only such variations. Computer system 700 could include a processor 710, a memory 720, an input/output interface (herein I/O or I/O interface) 730, and a main bus 740. Main bus 740 could provide communication pathways for the other components of computer system 700. In an embodiment, main bus 740 connects to other components such as a specialized digital signal processor (not depicted). In an embodiment, the computer system is computer system 700 as shown in FIG. 7, that executes a managing telephone interactions script or computer software application that carries out the operations of at least a method 300.

In an embodiment, processor 710 of computer system 700 includes one or more cores 712A, 712B, 712C, 712D (collectively cores 712). In an embodiment, processor 710 additionally includes one or more memory buffers or caches (not depicted) that provide temporary storage of instructions and data for cores 712. Cores 712 perform instructions on input provided from the caches or from memory 720 and output the result to caches or the memory. In an embodiment, cores 712 could include one or more circuits configured to perform one or more methods consistent with embodiments of the present invention. In an embodiment, computer system 700 contains multiple processors 710. In an embodiment, computer system 700 is single processor 710 with singular core 712.

In an embodiment, memory 720 of computer system 700 includes a memory controller 722. In an embodiment, memory 720 includes a random-access semiconductor memory, a storage device, or a storage medium (either volatile or non-volatile) for storing data and programs. In an embodiment, the memory could be in the form of modules (e.g., dual in-line memory modules). Memory controller 722 could communicate with processor 710, facilitating storage and retrieval of information in memory 720. In an embodiment, memory controller 722 communicates with I/O interface 730, facilitating storage and retrieval of input or output in the memory 720.

In an embodiment, I/O interface 730 comprises an I/O bus 750, a terminal interface 752, a storage interface 754, an I/O device interface 756, and a network interface 758. I/O interface 730 could connect main bus 740 to I/O bus 750. I/O interface 730 could direct instructions and data from processor 710 and memory 720 to the various interfaces of I/O bus 750. I/O interface 730 could also direct instructions and data from the various interfaces of I/O bus 750 to processor 710 and memory 720. The various interfaces could include terminal interface 752, storage interface 754, I/O device interface 756, and network interface 758. In an example, the various interfaces could include a subset of the aforementioned interfaces (e.g., an embedded computer system in an industrial application could not include terminal interface 752 and storage interface 754).

In an example, logic modules throughout computer system 700—including but not limited to memory 720, processor 710, and I/O interface 730—could communicate failures and changes to one or more components to a hypervisor or operating system (not depicted). The hypervisor or the operating system could allocate the various resources available in computer system 700 and track the location of data in memory 720 and of processes assigned to various cores 712. In embodiments that combine or rearrange elements, aspects and capabilities of the logic modules could be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In an embodiment, electronic circuitry includes programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
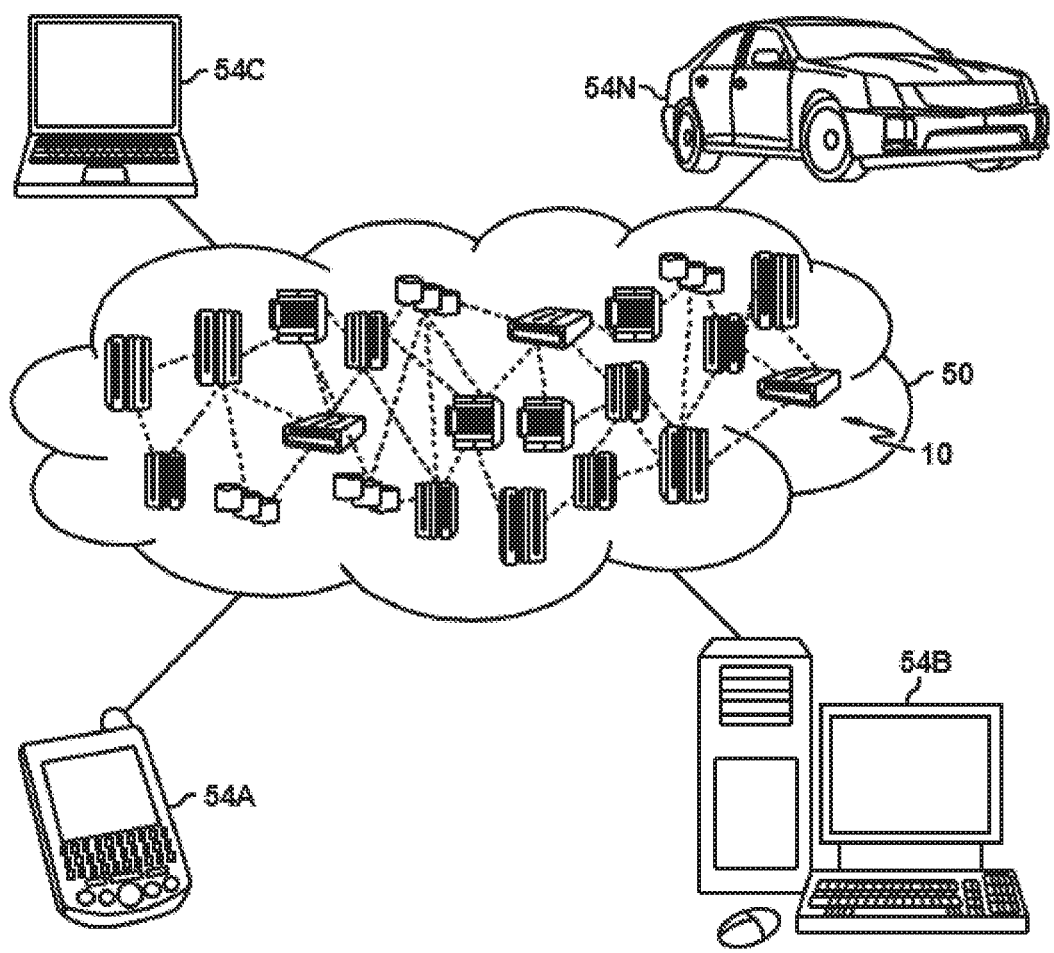
FIG. 8 depicts a cloud computing environment, in accordance with an exemplary embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
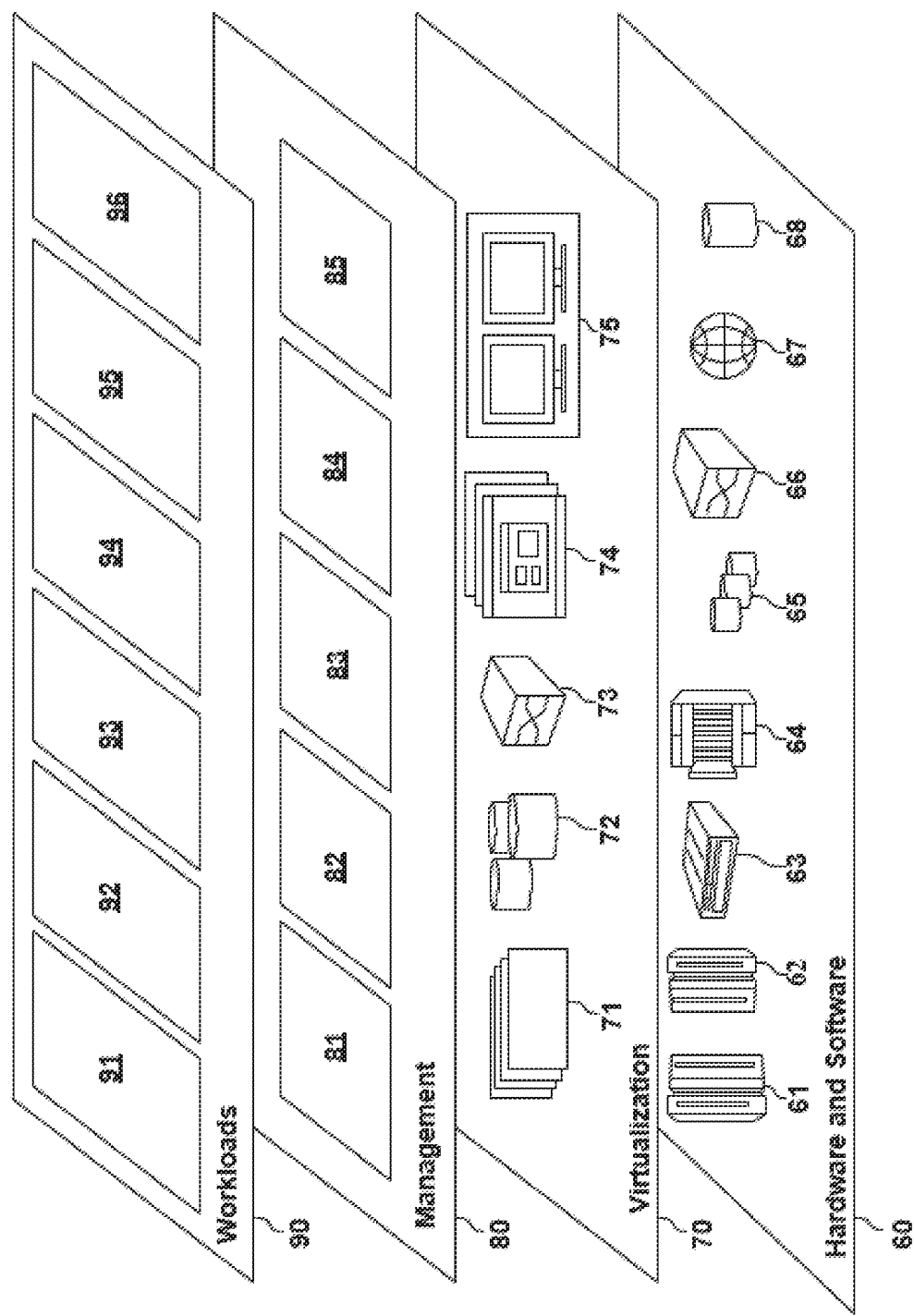
FIG. 9 depicts abstraction model layers, in accordance with an exemplary embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In an embodiment, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sensor profile and calibration parameter associating 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   in response to receiving data from at least one calibration sensor and data from an itinerant sensor, comparing the data from the at least one calibration sensor and the data from the itinerant sensor;
   in response to the comparing, determining, by one or more processors, an accuracy of the itinerant sensor;
   generating, by the one or more processors, one or more calibration parameters based on the determining and based on a machine learning associated with preexisting sensor information; and
   adjusting, by the one or more processors and based on the one or more calibration parameters, the itinerant sensor.

2. The method of claim 1 further comprising calibrating the itinerant sensor in response to determining the itinerant sensor is within a first range of the at least one calibration sensor,
   wherein the one or more calibration parameters is an adjustment to a readout of the itinerant sensor.

3. The method of claim 1 further comprising recording itinerant sensor data in response to determining the itinerant sensor is within a second range of the at least one calibration sensor.

4. The method of claim 1 further comprising:
   in response to receiving a second set of data from the itinerant sensor and a set of data from a mobile sensor, comparing the second set of data from the itinerant sensor and the data from the mobile sensor;
   in response to the comparing the second set of data from the itinerant sensor and the data from the mobile sensor, determining, by one or more processors, an accuracy of the mobile sensor;
   generating, by the one or more processors, one or more mobile sensor calibration parameters based on the determining the accuracy of the mobile sensor and based on a machine learning associated with preexisting mobile sensor information; and
   executing, by the one or more processors, the one or more mobile sensor calibration parameters.

5. The method of claim 4,
   wherein the mobile sensor is beyond a reliability range of the at least one calibration sensor, and
   wherein the mobile sensor is within a reliability range of the itinerant sensor.

6. The method of claim 1, wherein the one or more calibration parameters comprises reporting a result of the comparing to a computer system.

7. The method of claim 1 wherein the machine learning includes identifying patterns and associations between the at least one calibration sensor and the itinerant sensor based on data associated with an itinerant sensor type.

8. A system comprising:
   at least one calibration sensor;
   an itinerant sensor;
   a memory; and
   one or more processors in communication with the memory, the itinerant sensor, and the memory, the processor configured to perform a method comprising,
   in response to receiving data from the at least one calibration sensor and data from the itinerant sensor, comparing the data from the at least one calibration sensor and the data from the itinerant sensor,
   in response to the comparing, determining an accuracy of the itinerant sensor,
   generating one or more calibration parameters based on the determining and based on a machine learning associated with preexisting sensor information, and
   adjusting, based on the one or more calibration parameters, the itinerant sensor.

9. The system of claim 8 further comprising calibrating the itinerant sensor in response to determining the itinerant sensor is within a first range of the at least one calibration sensor,
   wherein the one or more calibration parameters is an adjustment to a readout of the itinerant sensor.

10. The system of claim 8 further comprising recording itinerant sensor data in response to determining the itinerant sensor is within a second range of the at least one calibration sensor.

11. The system of claim 8 further comprising:
    in response to receiving a second set of data from the itinerant sensor and a set of data from a mobile sensor, comparing the second set of data from the itinerant sensor and the data from the mobile sensor;
    in response to the comparing the second set of data from the itinerant sensor and the data from the mobile sensor, determining an accuracy of the mobile sensor;
    generating one or more mobile sensor calibration parameters based on the determining the accuracy of the mobile sensor and based on a machine learning associated with preexisting mobile sensor information; and
    executing the one or more mobile sensor calibration parameters.

12. The system of claim 11,
    wherein the mobile sensor is beyond a reliability range of the at least one calibration sensor, and
    wherein the mobile sensor is within a reliability range of the itinerant sensor.

13. The system of claim 8, wherein the one or more calibration parameters comprises reporting a result of the comparing to a computer system.

14. The system of claim 8 wherein the machine learning includes identifying patterns and associations between the at least one calibration sensor and the itinerant sensor based on data associated with an itinerant sensor type.

15. A computer program product comprising a computer readable storage medium having program instructions embodied therewith, the program instructions executable by a processor to cause the processor to perform a method comprising:
    in response to receiving data from at least one calibration sensor and data from an itinerant sensor, comparing the data from the at least one calibration sensor and the data from the itinerant sensor;
    in response to the comparing, determining an accuracy of the itinerant sensor;
    generating one or more calibration parameters based on the determining and based on a machine learning associated with preexisting sensor information; and
    adjusting, based on the one or more calibration parameters, the itinerant sensor.

16. The computer program product of claim 15 further comprising calibrating the itinerant sensor in response to determining the itinerant sensor is within a first range of the at least one calibration sensor,
    wherein the one or more calibration parameters is an adjustment to a readout of the itinerant sensor.

17. The computer program product of claim 15 further comprising recording itinerant sensor data in response to determining the itinerant sensor is within a second range of the at least one calibration sensor.

18. The computer program product of claim 15 further comprising:
    in response to receiving a second set of data from the itinerant sensor and a set of data from a mobile sensor, comparing the second set of data from the itinerant sensor and the data from the mobile sensor;
    in response to the comparing the second set of data from the itinerant sensor and the data from the mobile sensor, determining an accuracy of the mobile sensor;
    generating, by the one or more processors, one or more mobile sensor calibration parameters based on the determining the accuracy of the mobile sensor and based on a machine learning associated with preexisting mobile sensor information; and
    executing the one or more mobile sensor calibration parameters.

19. The computer program product of claim 18,
    wherein the mobile sensor is beyond a reliability range of the at least one calibration sensor, and
    wherein the mobile sensor is within a reliability range of the itinerant sensor.

20. The computer program product of claim 15, wherein the one or more calibration parameters comprises reporting a result of the comparing to a computer system.

* * * * *